United States Patent [19]
Huyer et al.

[11] Patent Number: 5,544,524
[45] Date of Patent: Aug. 13, 1996

[54] APPARATUS AND METHOD FOR PREDICTING FLOW CHARACTERISTICS

[75] Inventors: Stephen A. Huyer, Portsmouth; John R. Grant; James S. Uhlman, both of Jamestown, all of R.I.

[73] Assignee: The United States of America as represented by the Secretary of the Navy, Washington, D.C.

[21] Appl. No.: 506,583

[22] Filed: Jul. 20, 1995

[51] Int. Cl.[6] ............................................. G01M 9/00
[52] U.S. Cl. ................................................... 73/147
[58] Field of Search ................... 73/147, 861.22, 73/861.23, 861.24, 195, 196; 137/804

[56] References Cited

U.S. PATENT DOCUMENTS

| | | | |
|---|---|---|---|
| 3,709,036 | 1/1973 | Schwind | 73/147 |
| 3,787,874 | 1/1974 | Urban | 73/147 |
| 3,890,835 | 6/1975 | Dötzer et al. | 73/147 |
| 4,250,249 | 2/1981 | Montag | 73/147 |
| 4,375,768 | 3/1983 | Beck et al. | 73/861.23 |
| 4,380,170 | 4/1983 | Dötzer et al. | 73/147 |
| 4,727,751 | 3/1988 | Holmes et al. | 73/147 |
| 4,809,558 | 3/1989 | Watson et al. | 73/861.22 |
| 5,005,427 | 4/1991 | Ohmae | 73/861.22 |

Primary Examiner—Hezron E. Williams
Assistant Examiner—William L. Oen
Attorney, Agent, or Firm—Michael J. McGowan; James M. Kasischke; Prithvi C. Lall

[57] ABSTRACT

A method and apparatus for predicting flow over an object such as an air foil or hydrofoil. The vortex strength for each of a plurality of vortex segments is obtained over an area of interest. The vortex segments are grouped into a series of square area defined by a series of boxes having different sizes. Initially a vortex strength is established for each of the smallest boxes and the coefficients then provide characteristic vortex strengths for a given box. The conversion of these vortex strengths into velocities is accomplished by directly computing the velocity of a given vorticity segment as influenced by all the vorticity segments in the box containing the given vorticity segment and the direct influence of each vortex segment in that box and any neighboring boxes. The influence of other vorticity segments outside the neighboring boxes is provided by using the influence of the average vortex strength of a given box or group of boxes. This approach significantly reduces the number of computations required to obtain the prediction.

16 Claims, 6 Drawing Sheets

FIG. 6

APPARATUS AND METHOD FOR PREDICTING FLOW CHARACTERISTICS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

This invention generally relates to the analysis of fluid flow past an object and more particularly to a method and apparatus for predicting the characteristics of a fluid flowing past such an object.

(2) Description of the Prior Art

Understanding the characteristics of fluid as it flows past an object, such as an airfoil, is important both from the standpoint of understanding and improving the designs of such objects and in understanding the nature of any turbulence introduced as a result of relative motion of a fluid an airfoil, either by moving of the airfoil through the fluid or by moving the fluid past the airfoil.

In the past understandings of fluid flow have been derived from the observation of fluid flow past a model and by specific measurements. For example, U.S. Pat. No. 3,787,874 to Urban discloses a method for making boundary layer flow conditions visible by applying to the surface of a moving or stationary structural body to be exposed to the flow a reactive layer of at least one chemical color indicator, such as a cholesterinic liquid. The body is exposed to a flow of gas, such as air, which contains a reagent. The chemical color indicator can also be applied together with gelling means and a moisture binder. The chemical color indicator can also be absorbed by a high-contrast, absorbent paper which is then applied to the body. A metal or plastic foil coated with a binder and/or indicator can also be used for this purpose. A boundary layer flow pattern image is produced, which can subsequently be recorded.

U.S. Pat. No. 3,890,835 to Dötzer et al. discloses another approach to chemically recording flow patterns by treating the surface to form a reactive layer, entraining in the fluid a reagent compound which is capable of chemically changing the reactive layer, and then passing the fluid over the reactive layer which is to be examined. In this particular disclosure, a blade or other member of aluminum to be examined is treated to form a thin oxide film by anodic treatment. This film is impregnated with an organic dye. As an air stream containing a reactive substance passes over the treated blade, the acid vapors react with the dye and/or the oxide layer and produce a visible pattern upon the blade. This pattern is characteristic of the boundary layer flow of the air stream. An examination of the visible pattern helps to determine the proper design and operating characteristics of the blade.

U.S. Pat. No. 4,380,170 to Dötzer et al. discloses another process for chemically plotting the boundary layer flows over uncompacted, coated, anodically oxidized aluminum surfaces by using a colored or uncolored liquid or a coating or pointillization with a substance, preferably a dye, soluble in water or organic media and which can be included or adsorbed in the eloxal layer.

U.S. Pat. No. 4,727,751 discloses a mechanical sensor for determining cross flow vorticity characteristics. This sensor comprises cross flow sensors which are non-invasively adhered to a swept wing laminar surface either singularly, in multi-element strips, in polar patterns or orthogonal patterns. These cross flow sensors comprise hot-film sensor elements which operate as a constant temperature anemometer circuit to detect heat transfer rate changes. Accordingly, crossflow vorticity characteristics are determined via cross-correlation. In addition, the crossflow sensors have a thickness which does not exceed a minimum value in order to avoid contamination of downstream crossflow sensors.

These prior art approaches present visualizations or measurements that define certain aspects of the characteristics of fluid flow. However, they are designed primarily to determine characteristics at a boundary layer or some other localized site. Each requires the production of a physical model and physical testing of such models. Moreover, if the testing suggests any change to the shape of an airfoil, it is generally necessary to modify the physical model and run the tests again in order to validate any change. Such testing can become time-consuming and expensive to perform.

More recently, it has been proposed to utilize computer modeling techniques to produce such fluid flow analyses. Such computer modeling is attractive because it eliminates the need for physical models and holds the opportunity to reduce testing, particularly if design changes are made to an object undergoing test. Initially such techniques were applied to circular cylinders using a small number of discrete point vortices.

Eventually additional studies determined that vorticity was useful as a basis for understanding fluid flow. Vorticity is produced at a solid boundary because at the surface the fluid has no velocity (i.e., the fluid exhibits a no-slip condition). Once generated at the surface, vorticity diffuses into the volume of the fluid where it is advected by local flow. Conventional vortex methods generally mime this process. In accordance with such methods, the strengths of the vortex elements or segments originating on the body surface are determined by requiring that the velocity induced by all the vortex elements on the surface be equal and opposite to the velocity at the surface. It is assumed that this vorticity is contained in an infinitely thin sheet at the surface. In these methods a resulting matrix equation is solved for the surface vorticity at all points on the body simultaneously. Vorticity transfer to the flow is then accomplished by placing the vortex elements above the surface.

It has been recognized that these vortex methods have several shortcomings. When computational methods use point vortices in their simulations, mathematical singularities can produce divergent solutions. This has been overcome by using a kernel function that contains a regularized singularity. However, this kernel function depends in certain ad hoc assumptions such as the value of the cutoff velocity and core radius. While the no-slip and no-flow boundary conditions provide information regarding the strength of the surface vorticity and subsequent strength of the vortex element, their use often neglects the effects of all other vortex sheets on the surface. Other implementations of such methods neglect the effects of coupling between the surface vortex sheets and surface sources. Finally, many methods assume a priori a separation point to analyze shedding of vorticity from the surface into the flow that generally requires experimental knowledge of the flow.

More recent prior art has utilized computer modeling based upon the nature of vortex elements at the surface of an object, such as an airfoil. These models then track the motion of each element as it moves into the flow over time to calculate the velocity of each element. While this prior art produces acceptable results, the direct calculation of the velocity of each vortex element produces an $N^2$ increase in the required time for processing where N is the number of vortex elements for each time step. Such increases can become unacceptable when high resolution demands the calculation of a large number of vortex elements.

SUMMARY OF THE INVENTION

Therefore, it is an object of this invention to provide an improved method and apparatus for predicting the flow of fluid past an object.

Another object of this invention is to provide an improved method and apparatus for predicting the flow of fluid past an object that is readily adapted for computer simulation.

Still another object of this invention is to provide an improved method and apparatus for predicting the flow of fluid past an object that minimizes the assumptions used in the predictions.

Yet another object of this invention is to provide an improved method and apparatus for predicting the flow of fluid past an object for a large number of points in an area of interest thereby to provide maximum resolution for the prediction.

In accordance with a method and apparatus of this invention fluid flow characteristics are predicted by defining a model of the object and defining a plurality of vorticity segments over the area of interest including vorticity segments at the surface of the object having a known velocity. In addition, there are defined over the area of interest a plurality of sets of boxes. Each set has a predetermined relationship in size and position to the boxes in the other sets. The velocity for each vorticity segment is calculated based upon the vorticity of that segment, the vorticity of each segment in the same box and in neighboring boxes and the vorticity of groups of other boxes surrounding the neighboring boxes taken collectively. Each of these velocities is summed to determine the velocity of each vorticity segment based upon the influence of all the vorticity segments in the area of interest and to provide information for displaying a representation of the fluid flow characteristics over the area of interest.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
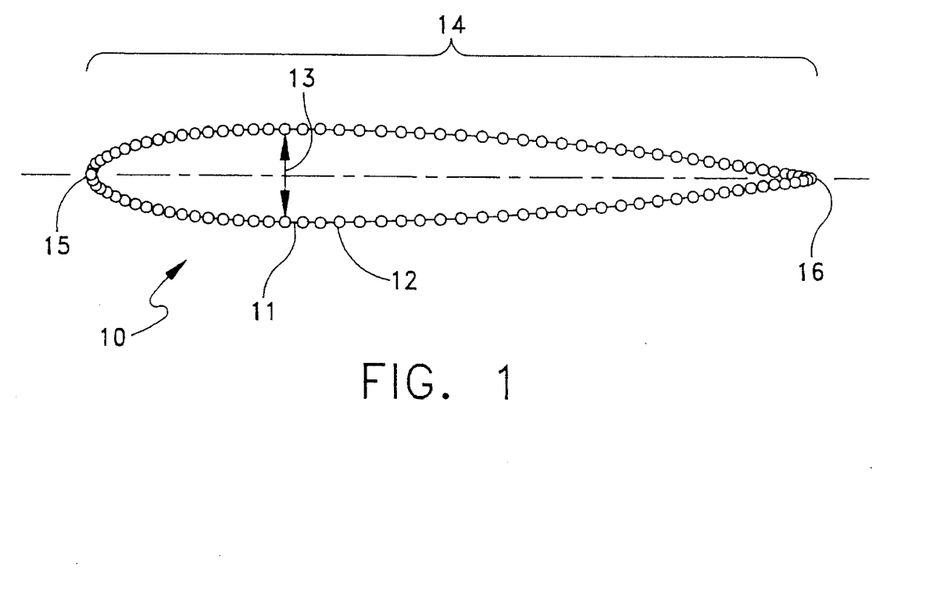
FIG. 1 represents a line segment representation of an airfoil cross-section.

FIG. 1 depicts a representation or model 10 of a standard foil, such as an airfoil or hydrofoil, constructed by connecting 200 line segments 11 between adjacent body points 12. This particular airfoil is symmetrical in cross section and has a maximum airfoil section thickness 13 that is 15% of the length of its chord 14. The airfoil chord length has a non-dimensional length of 1.0. Body points are clustered near the leading edge 15 and trailing edge 16 of the airfoil 10 to better resolve the flow at those locations. It will apparent that similar models can also be produced to represent objects with other cross-sectional shapes.

Figure 2:
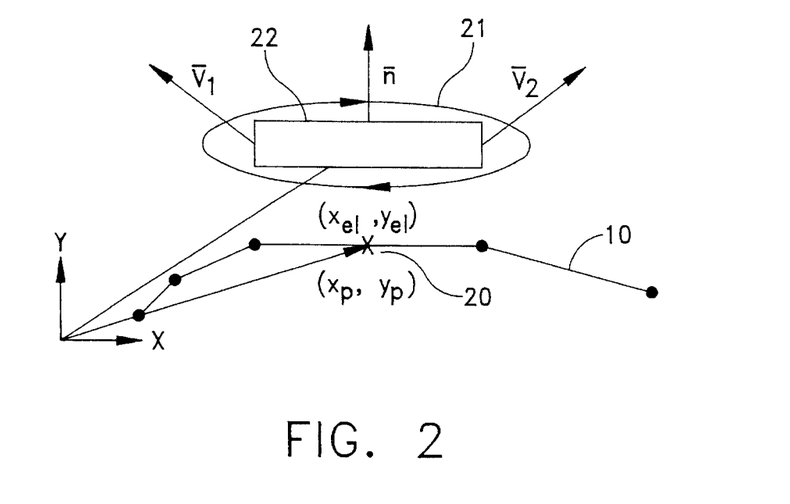
FIG. 2 depicts the geometry of a vorticity segment useful in understanding this invention.

In accordance with this invention there is defined, as an initial condition, a vorticity segment at each body point 12. FIG. 2 discloses one such vorticity segment 20 at the surface of the airfoil 10 centered at location $(x_p, y_p)$. This vorticity segment 20 and others at the surface are infinitely thin. FIG. 2 discloses another vorticity segment 21 off the surface of the airfoil 10 at a location $(x_{et}, y_{et})$. This vorticity segment 21 is prescribed to have the appearance of a flat panel 22 with a finite thickness. Each such segment on the surface of the airfoil 10 carries two velocity generators, namely: (1) a surface vortex distribution lying in the plane of the segment and (2) a potential source. It is assumed that both distributions are uniform over an individual segment. The vortex strength parameter characterizing any panel is the velocity jump or change across the panel. As known, the velocity due to a potential source, $\alpha$, and $\vec{\gamma}$ on a contour C is $$\vec{u}(\vec{x}) = \frac{1}{2\pi} \int_C \frac{\alpha(\vec{x'})(\vec{x}-\vec{x'})}{|\vec{x}-\vec{x'}|^2} d\vec{x'} + \frac{1}{2\pi} \int_C \frac{\vec{\gamma}(\vec{x'}) \times (\vec{x}-\vec{x'})}{|\vec{x}-\vec{x'}|^2} d\vec{x'}$$

$$= \sum_{n=1}^{N} \{-\alpha_n \vec{B}_n + \vec{\gamma}_n \times \vec{B}_n\}$$

(1)

and $$\vec{B}_n = \frac{1}{2\pi} \int_{l_n} \frac{\vec{x}-\vec{x'}}{|\vec{x}-\vec{x'}|^2} d\vec{x'}$$

(2)

where $B_n$ is the expression for the far-field influence of all vorticity segments in terms of a set of coefficients defining the velocity jump across panels as represented by a series of coefficients. The solution of equation (2) is well known in the art.

As will also be apparent, if an object, such as the airfoil 10 in FIG. 1, is defined by N panels, there are 2N unknowns. However, it is also required that the total velocity be zero at the control point, or centroid, of each segment. This constraint produces an equivalent number of equations. The integral of vorticity over a bounded volume is zero when the velocity goes to zero at the bounding surface. Thus the integral of the vortex strength over the body surface must also be zero. The integral of the surface potential source over the body surface must also be zero by continuity. Consequently, there exists a set of 2N+2 equations that enable a matrix solution for the surface quantities through Lagrange multipliers to that the integral constraints are met exactly and the 2N velocity boundary conditions are satisfied in a least-squares sense.

The transfer of vorticity from the surface into the flow is accomplished by the creation of rectangular vorticity elements lying just above the body surface, such a the element 21 shown in FIG. 2. After each element is produced at the surface, it moves to a position directly above the surface and has an initial thickness equal to $$\sqrt{2\nu\Delta t} \tag{3}$$

and the vorticity of the element is:

$$\vec{\omega} \cdot dA = \vec{\gamma} \cdot dl \tag{4}$$

where $\Delta t$ is the size of the time step, $\vec{\omega}$ is the element vorticity, dA is the element area, $\vec{\gamma}$ is the surface velocity jump on the panel and dl is the surface panel length.

Each elevated vorticity segment has the same length as the respective segment over which it lies. Therefore, each element is assigned a vortex strength based upon the velocity jump of the underlying surface panel. Its associated velocity field is determined by the Biot-Savart integral:

$$\vec{u}(\vec{x}) = \frac{1}{2\pi} \int_S \frac{\vec{\omega} \times (\vec{x} - \vec{x}')}{|\vec{x} - \vec{x}'|} \, dS \tag{5}$$

Immediately after vorticity is shed in this fashion, minimal surface vorticity is required to satisfy the no-slip velocity boundary condition. As the elements move away from their original position through advection and diffusion, increase surface vorticity, $\vec{\gamma}$, is required to meet these boundary conditions until eventually the new vorticity is shed into the flow by creation of a new family of elements. Vortex elements are shed every 0.1 non-dimensional time (t) units.

The evolution of vorticity is prescribed by the vorticity equation. In two dimensions, this equation is:

$$\frac{\partial \vec{\omega}}{\partial t} = -(\vec{u} \cdot \vec{\nabla})\vec{\omega} + \nu \vec{\nabla}^2 \vec{\omega} \tag{6}$$

The terms on the right side of equation (6) describe the change in vorticity at a point through advection and diffusion, respectively. The effect of advection is accounted for by moving element control points with the local velocity. As shown in FIG. 2, each end point is advected separately allowing for lengthening or shortening as well as rotation of the element. Since the lengths of the elements continually change, the total circulation, defined as $\vec{\omega} \cdot dA$ must remain constant. To achieve this condition, the thickness of the element varies to keep dA constant. Since each vortex segment can infinitely stretch or compress, there is an upper limit on their maximum length. If the vortex segment exceeds this threshold length, it is split into two elements of equal length. Computational this generates a huge number of elements. As an offset, if two vortex segments cross, they are amalgamated in such a way that both linear and angular momentum is conserved. There is also a minimum thickness bound applied on the Kolmogrov length scale that is approximated as:

$$\sqrt{\frac{\nu}{|\omega|}} \tag{7}$$

where $\nu$ is the non-dimensional kinematic viscosity and $|\omega|$ is the magnitude of the vorticity in the segment. After this minimum thickness is reached, the total area of the element is allowed to increase with a concomitant decrease in vorticity to satisfy conservation of total vorticity.

The effects of diffusion can be incorporated by the use of conventional random walk techniques that provide a standard deviation of:

$$\sqrt{2\nu\Delta t} \tag{8}$$

where $\Delta t$ is the time step size. It is this expression, the placement of the elements as they are shed from the surface, and minimum element thickness that are Reynolds number dependent. In non-dimensional terms, the kinematic viscosity, $\nu$, is the inverse of the Reynolds number since both chord and freestream velocity are equal to unity.

The stepping in time of the strengths of each vorticity segment and of the segment control points is accomplished using a standard predictor-corrector scheme with one correction applied to the predictor step. Surface pressure was computed according to the method described in Uhlman, J. S., "an integral equation formulation of the equations of motion of an incompressible fluid," Naval Undersea Warfare Center Technical Report 10,086, 15 Jul. 1992. According to that method, that is based on stagnation enthalpy:

$$\beta H + H \frac{\partial}{\partial n} \ln\left(\frac{1}{r}\right) dl = \tag{9}$$

$$\left\{ \vec{n} \cdot \frac{\partial}{\partial t} (\vec{U}_\infty + \vec{u}) \ln\left(\frac{1}{r}\right) + \nu \frac{\vec{r} \cdot (\vec{n} \times \vec{\omega})}{r^2} \right\} \int \int_v \frac{\vec{r}[(\vec{U}_\infty + \vec{u}) \times \vec{\omega}]}{r^2} \, dV$$

where $$H = \frac{p - p_\infty}{p} + \frac{1}{2} [(U_\infty + u) - U_\infty^2] \tag{10}$$

The first term in the first interval on the right hand side of Equation (9) accounts for any pitching motion of the air foil 10 or other object. On the surface, $$U_\infty + u = 0.0 \tag{11}$$

so $$C_p = 1.0 + 2.0 * H \tag{12}$$

When the foregoing steps have been completed, the vorticity of every vorticity segment in an area of interest has been determined. However, as is known, the velocity vector associated with any vorticity segment is dependent not only upon the vorticity of that segment but, to various degrees the vorticity strengths of all surrounding vorticity segments. Conventional processing would involve for the determination of the velocity of any particular vorticity segment, the summation of the influence of the velocity of that vorticity segment as influenced by each of the surrounding vorticity segments. Thus, if there are N vorticity segments, a conventional conversion of vorticity to velocity would include $N^2$ calculations. This puts a tremendous burden on processing particularly as the resolution with the concomitant increase in the number of vorticity segments required to achieve that resolution.

However, it is also known that the influence of a second vorticity element adjacent a given vorticity segment is greater than the influence of the vorticity of another vorticity segment that is located remotely from the given vorticity segment. Stated differently, the far-field effect of any collection of vorticity segments can be expressed as a multipole expansion about the center of a collection of those vorticity segments whose coefficients are merely the sums of the moments of the vortex strengths about that center. This fact allows the construction of a far-field expansion for the collection solely from the knowledge of the vortex strengths and locations. As the number of vortex segments increases, this allows the far-field influence of any collection of vortex segments to be computed to any desired accuracy from a truncation of a multipole expansion.

Figure 3A:
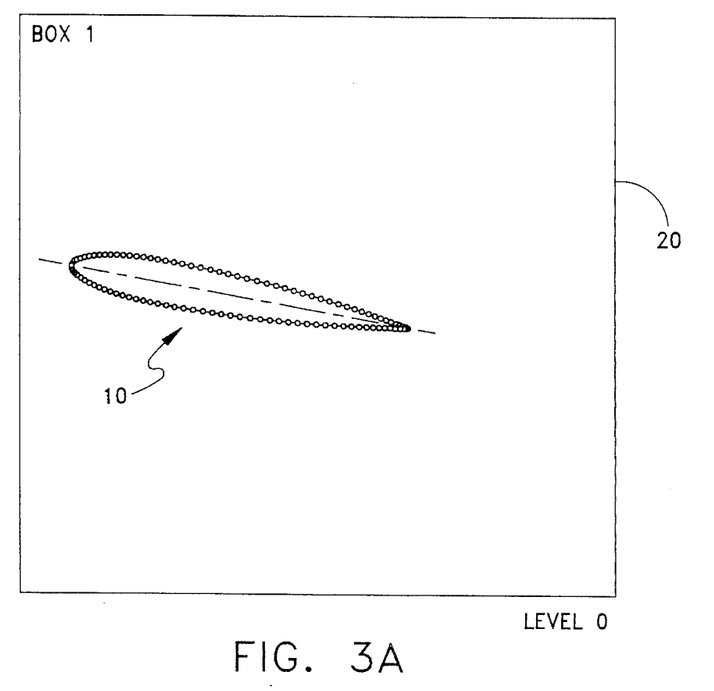
FIGS. 3A through 3D depict a box numbering scheme that is useful in implementing this invention.

In accordance with this method and with reference to FIG. 3A, an area of interest concerning the flow over an air foil 10 is defined by a Level 0 square box 20 that is the first level of a tree structure to distinguish vortex segments whose influence must be computed directly from those whose influence may be computed from a multipole expansion. The area of interest bounded by the Level 0 box 20 is defined as containing the complete collection of vortex segments.

Figure 3B:
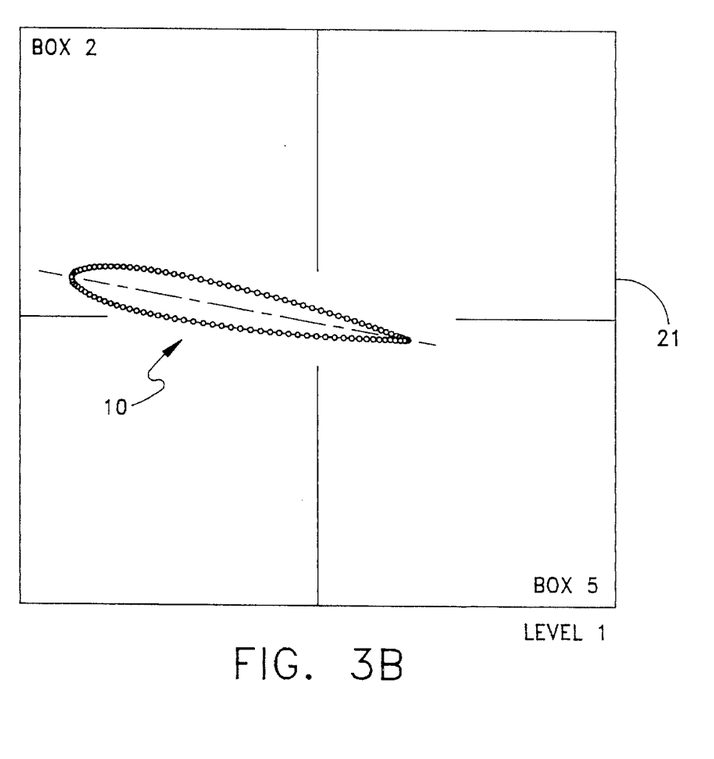
Figure 3C:
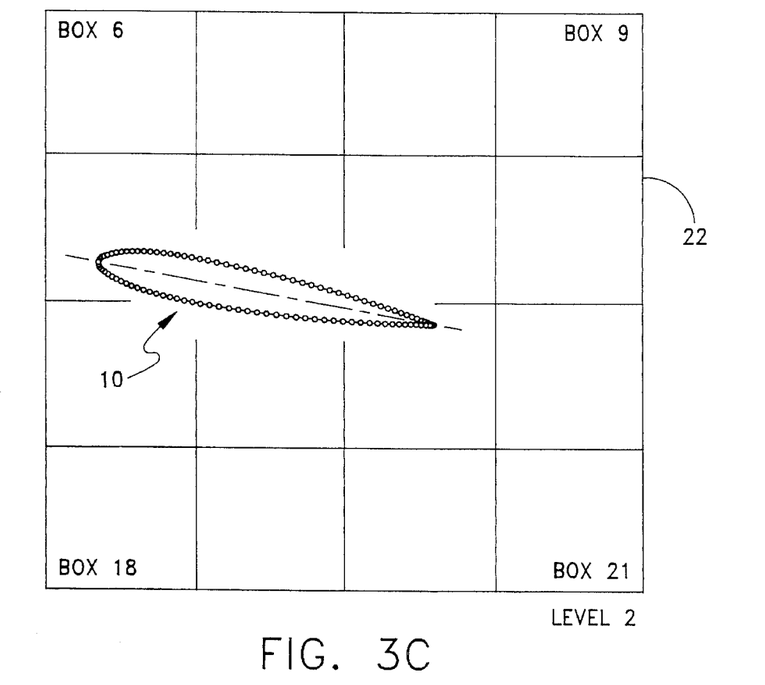
Figure 3D:
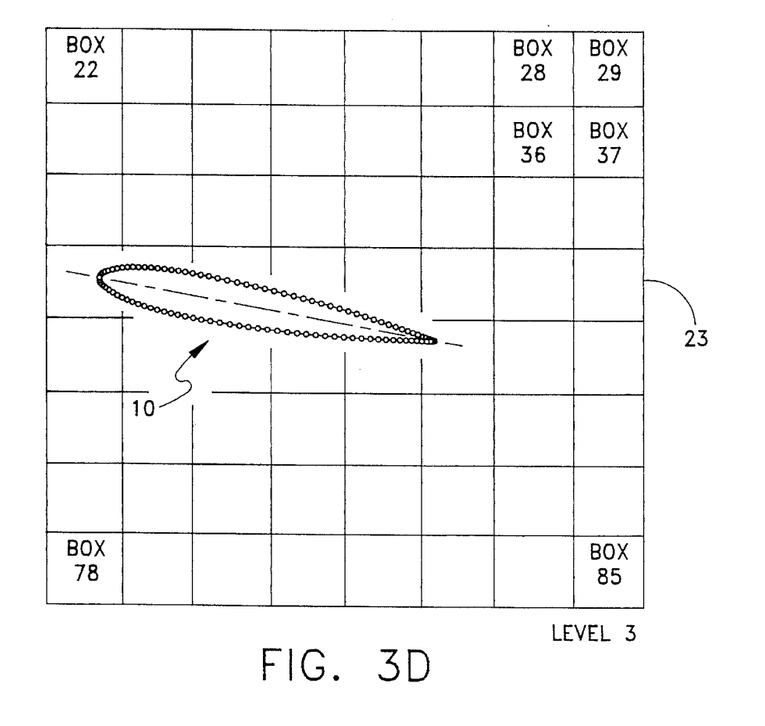

The box 20 is then subdivided into a set of four equally sized Level 1 boxes as shown in FIG. 3B that are identified as BOX 2 through BOX 5. Each of these boxes is further subdivided into sixteen Level 2 boxes 22 as shown in FIG. 3C and further divided an array 23 of sixty-four Level 3 boxes as shown in FIG. 3D. If additional resolution is required, additional levels can be produced by further subdividing each successive level. As will be apparent, the number of boxes at any level is $4^L$ where L is the level from 0 to $L_{max}$.

In accordance with this method the coefficients are computed for each of the boxes, BOX 22 through BOX 85 in the Level 3 array 23 shown in FIG. 3D. To obtain coefficients about the center of the box for a truncated multipole expansion of the vortex segments that reside in this box. Once this is accomplished, the coefficients for the truncated multipole expansion for the vortex segments in a box at the next highest level are computed about the center of this box. For example, BOX 9 in FIG. 3C corresponds to BOXES 28, 29, 36 and 37 in FIG. 3D and the coefficients generated with respect to those boxes in FIG. 3D are then used to provide a set of coefficients for BOX 9 in FIG. 3C. This step can be accomplished by simple summation and translation operations. When this procedure has been completed, truncated multipole expansions are obtained for all boxes at all levels.

Once this procedure is completed, velocities for each vortex segment are determined beginning at the second level below the largest box to define an interaction list for each box. This list identifies the boxes for which the interaction must be computed directly. For each of these boxes the coefficients of a Taylor series expansion are obtained about the center and are computed from the coefficients of the multipole expansions and are taken with respect to the center of a smaller box using recursion relationships. The process continues until the Taylor series expansions have been computed for all boxes at all levels.

Once the computation of the Taylor series coefficients is complete, the computation for the interactions begins. This proceeds by computing the direct interaction for all vortex segments in the same box as a field point and for all vortex segments in the boxes on the interaction list of that box. The interaction for all other vortex segments are then computed for the Taylor series expansion for the local box. This procedure is repeated until all desired points and the computation is then complete.

Figure 4:
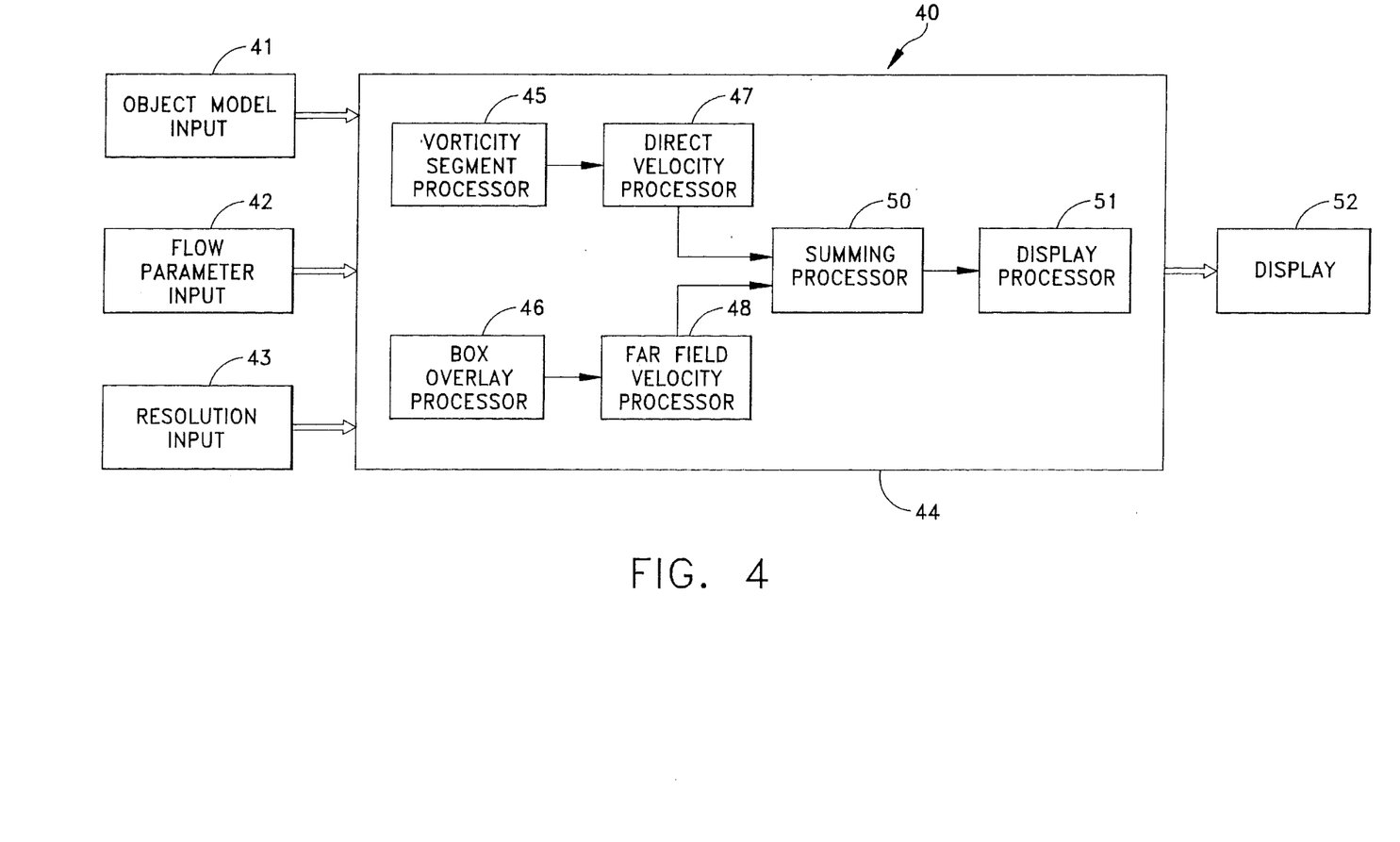
FIGS. 4 depicts, in schematic form, an apparatus embodiment of this invention.

FIG. 4 depicts, in schematic block form, one embodiment of apparatus that can perform the foregoing functions. The apparatus 40 includes a series of input devices, a processing system and an output or display device. More specifically, apparatus 40 includes an object model input 41 that provides a representation of the air foil 10, a flow parameter input 42 and a resolution input 43. The flow parameter input provides information such as free stream velocity, pressure, lift and drag coefficients, Reynolds numbers, kinematic viscosity and related parameters. The resolution input 43 establishes the maximum value of L and therefore another resolution that will used in providing the velocity representation. A processing system 44 is depicted in this particular embodiment as comprising a series of independent processors. A vorticity segment processor 45 provides the vorticity value for each vorticity segment in the area of interest shown in FIG. 3A. The box overlay processor 46 responds to information from the resolution input for providing the appropriate number of levels of boxes as shown in FIGS. 3A through 3D. A direct velocity processor 47 provides a direct velocity calculation for an individual segment and all the segments in its box and all neighboring boxes while a far field velocity processor 48 provides the approximations of velocity influence from more remote boxes as they represent the sum of all the vortex segments within a box.

A summing processor 50 combines the outputs from the direct velocity processor 47 and far field processor 58 to provide an input to a display processor 51 that can produce any of a variety of outputs on a display device 52.

It will be apparent that this structure can be implemented as a group of discrete processors performing these any other individual functions or by a general purpose computer system utilizing a variety of programs that perform the functions of the various processors shown in FIG. 4.

More specifically, the initial process begins by solving a two-dimensional vortex interaction whereby providing a two-dimensional vortex interaction solution wherein a stream function at a point (x,y) due to point vortex at $(\xi, \eta)$ is given by $$\psi(x,y;\xi,\eta) = \Gamma F(x,y;\xi,\eta) \qquad (13)$$

where $\Gamma$ is the circulation about the vortex. The velocity components associated with this stream function are then $$u = \frac{\partial \psi}{\partial y} \qquad (14)$$

and $$v = \frac{\partial \psi}{\partial x} \qquad (15)$$

The stream function due to a collection of these vortices is given by:

$$\psi = \sum_i \psi_i \qquad (16)$$

$$= \sum_i \Gamma_i F(x,y; \xi_i, \eta_i)$$

Although Equations (14) and (15) could be employed to obtain expressions for the velocity components of the system shown in FIGS. 3A through 3D, in accordance with this invention an expansion of the stream function is provided by Equation (16), which yields the following far-field form:

$$\psi_i = \Gamma_i \sum_{n=0}^{\infty} \frac{1}{n!} \left[ (\xi_i - \xi_0)\frac{\partial}{\partial \xi} + (\eta_i - \eta_0)\frac{\partial}{\partial \eta} \right]^n F(x,y;\xi_0,\eta_0) \qquad (17)$$

or $$\psi_i = \qquad (18)$$

$$\Gamma_i \sum_{n=0}^{\infty} \frac{1}{n!} \binom{n}{m} \frac{\partial^n F}{\partial \xi^{n-m} \partial \eta^m}\bigg|_{(x,y;\xi_0,\eta_0)} (\xi_i - \xi_0)^{n-m}(\eta_i - \eta_0)^m.$$

Thus, Equation (16) becomes $$\psi = \sum_{i=0}^{\infty} \sum_{n=0}^{\infty} \sum_{m=0}^{n} \frac{\Gamma_i}{n!} \binom{n}{m} \frac{\partial^n F}{\partial \xi^{n-m} \partial \eta^m}\bigg|_{(x,y;\xi_0,\eta_0)} (\xi_i - \xi_0)^{n-m}(\eta_i - \eta_0)^m \quad (19)$$

or $$\psi = \sum_{n=0}^{\infty} \sum_{m=0}^{n} A_{n-m,m} \frac{\partial^n F}{\partial \xi^{n-m} \partial \eta^m}\bigg|_{(x,y;\xi_0,\eta_0)} \quad (20)$$

where $$A_{n-m,m} = \sum_{i=0}^{\infty} \frac{\Gamma_i}{(n-m)!m!} (\xi_i - \xi_0)^{n-m}(\eta_i - \eta_0)^m. \quad (21)$$

It will now be apparent that the coefficients depend solely upon the circulation and location of the point vortices under consideration.

As previously indicated, it is also necessary to move the center of the expansion given above. This can be accomplished by performing a far-field expansion about the translated center $(\xi_0, \eta_0)$ as $$\psi(x,y;\xi,\eta) = \sum_{n=0}^{\infty} \sum_{m=0}^{\infty} A_{n-m,m} \frac{\partial^n F}{\partial \xi^{n-m} \partial \eta^m}\bigg|_{(x,y;\xi+\Delta\xi,\eta+\Delta\eta)}. \quad (22)$$

When the expansion $$F(x,y;\xi,\eta) = \sum_{n=0}^{\infty} \sum_{m=0}^{\infty} \frac{1}{n!} \binom{n}{m} \frac{\partial^n F}{\partial \xi^{n-m} \partial \eta^m} (\xi - \xi_0)^{n-m}(\eta - \eta_0)^m \quad (23)$$

is applied, Equation (22) becomes $$\psi(x,y;\xi,\eta) = \sum_{n=0}^{\infty} \sum_{m=0}^{\infty} A_{n-m,m} \sum_{p=0}^{\infty} \sum_{q=0}^{p} \frac{1}{(p-q)!q!} \frac{\partial^{n+p}F}{\partial\xi^{n-m+p-q}\partial\eta^{m+q}}\bigg|_{(x,y;\xi,\eta)} \Delta\xi^{p-q}\Delta\eta^q \quad (24)$$

or $$\psi(x,y;\xi,\eta) = \sum_{s=0}^{\infty} \sum_{t=0}^{s} \frac{\partial^s F}{\partial\xi^{s-t}\partial\eta^t}\bigg|_{(x,y;\xi,\eta)} \sum_{v=0}^{t} \sum_{u=v}^{v+s-t} A_{s-t-u+v,t-v} \frac{\Delta\xi^{u-v}\Delta\eta^v}{(u-v)!v!} \quad (25)$$

since $s = n+p$ and $t = m+q$ must remain constant. Thus $$\psi(x,y;\xi,\eta) = \sum_{n=0}^{\infty} \sum_{m=0}^{n} A_{n-m,m}' \frac{\partial^n F}{\partial \xi^{n-m} \partial \eta^m}\bigg|_{(n,y;\xi,\eta)} \quad (26)$$

where $$A_{n-m,m}' = \sum_{q=0}^{m} \sum_{p=q}^{q+n-m} A_{n-m-p+q,m-q} \frac{\Delta\xi^{p-q}\Delta\eta^q}{(p-q)!q!}. \quad (27)$$

In order to obtain the expansion of the field domain, or velocity, the far-field expansion about the translated center $(x_o, y_o)$ becomes $$\psi = \sum_{n=0}^{\infty} \sum_{m=0}^{n} A_{n-m,m}' \frac{\partial^n F}{\partial \xi^{n-m} \partial \eta^m}\bigg|_{(x_0+h,y_0+K;\xi,\eta)}. \quad (28)$$

Using an expansion similar to that used in Equation (22) becomes $$\psi(x,y;\epsilon,\eta) = \sum_{n=0}^{\infty} \sum_{m=0}^{n} A_{n-m,m} \sum_{p=0}^{\infty} \sum_{q=0}^{p} \frac{1}{(p-q)!q!} \frac{\partial^{n+p}F}{\partial x^{p-q}\partial\xi^{n-m}\partial y^q\partial\eta^m}\bigg|_{(x,y;\xi,\eta)} h^{p-q}k^p \quad (29)$$

and the Taylor series expansion is then given by $$\psi = \sum_{n=0}^{\infty} \sum_{m=0}^{n} B_{n-m,m} h^{n-m} k^m \quad (30)$$

where $$B_{n-m,m} = \sum_{p=0}^{L} \sum_{q=0}^{p} \frac{A_{p-q,q}'}{(n-m)!m!} \frac{\partial^{n+p}F}{\partial x^{n-m}\partial\xi^{p-q}\partial y^m\partial\eta^q}\bigg|_{(x,y;\xi,\eta)}. \quad (31)$$

The summation limit L is equal to the maximum value of N less n (i.e., L=N−n). Similar methods can be used to move the center of the expansion given above. Equation (30) then is the expression for the far-field influence of all vorticity segments that is also described with reference to Equation (2).

Figure 5:
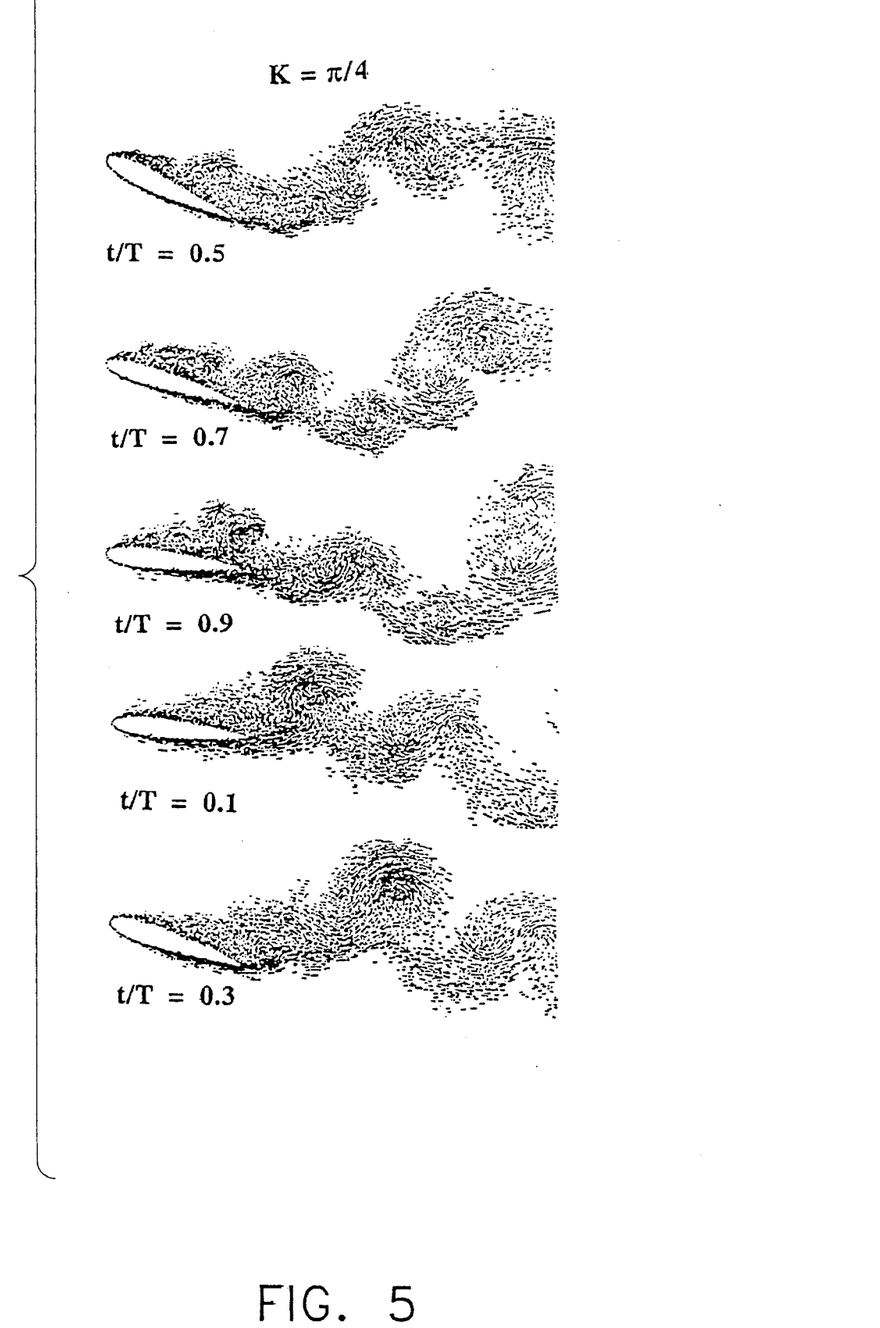
FIGS. 5 and 6 depict results that have been obtained using this invention.

FIG. 5 plots velocity vectors taken at vorticity element centroids as predicted in accordance with this invention. The sequence shown in FIG. 5 especially shows the adaptive nature of the boxes shown in FIGS. 3A through 3D. Higher concentrations of elements may be found in regions of high vorticity and coherent vortex structures. No vortex segments are indicative of regions of potential flow. This plot is taken for a reduced frequency of π/4 taken at different times relative to an oscillation period (t/T). At t/T=0.5, a number of vortex segments may be found near the leading edge. By t/T=0.7, however, the velocity vectors accumulate forming a dynamic stall vortex that may be seen at approximately the mid chord. By t/T=0.9 the vortex reaches the trailing edge and at t/T=0.1, these vortex segments have been shed into the wake. Accumulations of opposite vorticity may be seen nearing the trailing edge forming the trailing edge vortex. These elements advect down stream and eventually form a sinusoidal pattern in the air foil wake.

Figure 6:
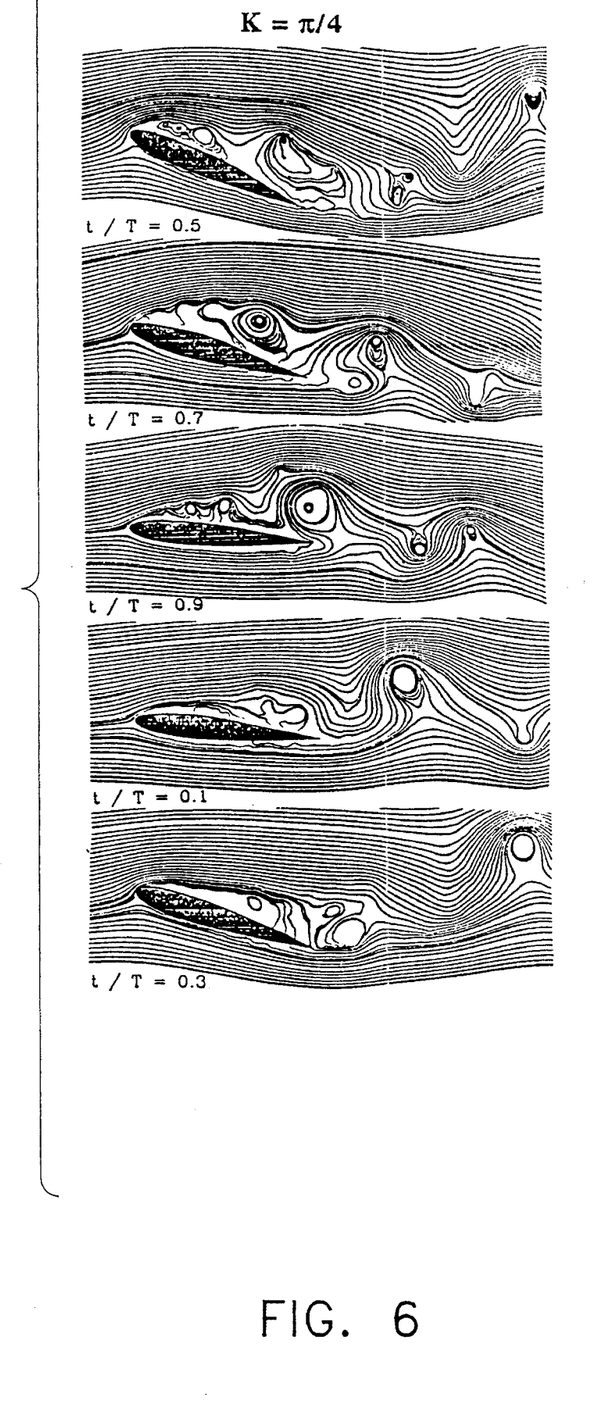

FIG. 6 shows the stream line plots for a k value of π/4 at t/T=0.5 initial formation of a leading edge vortex may be seen the quarter chord region. Unlike experimental results where only one vortex may be seen, this process predicts the formation of two leading edge vortices. The thickness of the separated region looks similar for both the predicted and experimental cases. Downstream there appears a relatively thick separated region consisting of a clockwise vorticity. By t/T=0.7, the vorticity in the separated region is shed into the wake and the leading edge vortices have combined to form a single dynamic stalled vortex which can be seen clearly at approximately 70% of the chord. Just up stream there appear to be smaller vortices in the separated region near the trailing edge. By t/T=0.9 the dynamic stalled vortex is just shed into the wake and is qualitatively similar to experimental results. By t/T=0.1, the dynamic stalled vortex is completely shed into the wake and a counter rotating trailing edge vortex can be seen. In addition the curvature of the streamline suggest an overall counterclockwise circulation about the air foil 10. This has also been observed experimentally. The flow field begins to reattach near the leading edge and continues as t/T=0.3.

These predictions track experimental results. They are obtained, however, without the need for the construction of a model and the physical testing of that model. Changing the shape of an object merely requires changing the model provided to the system. Thus this invention presents an opportunity for obtaining predictions of flow and turbulence around an air foil in an expeditious and cost-efficient manner.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. Apparatus for producing a representation of predicted flow in an area of interest around an object comprising:
   means for defining a model of the object,
   means for defining a plurality of vorticity segments over the area of interest including vorticity segments at the surface of the object having a known velocity,
   means for defining over the area of interest a plurality of sets of boxes, each set having a predetermined relationship in size and position to the boxes in the other sets,
   means for determining the velocity for each segment based upon the vorticity of that segment, the vorticity of each segment in the same box and in neighboring boxes and the vorticity of groups of other boxes surrounding the neighboring boxes taken collectively,
   means for summing the velocities thereby to determine the velocity of each segment based upon the influence of all the vorticity segments in the area of interest, and
   means responsive to the summed segment velocities for displaying the predicted flow over the area of interest.

2. Apparatus as recited in claim 1 wherein the velocity of each box is determined by summing the influence of all vorticities of the vortex segments in that box about the center of that box.

3. Apparatus as recited in claim 2 wherein each set of boxes has a predetermined level, L, wherein L=0 designates the first set of boxes and wherein each additional set of boxes comprises $4^L$ boxes.

4. Apparatus as recited in claim 3 wherein said velocity is defined on the bases of groups of other boxes for sets in which L>1.

5. Apparatus as recited in claim 3 wherein the relationship between the velocity and vorticity of each vorticity segment is given by:

$$\vec{u}(\vec{x}) = \frac{1}{2\pi} \int_C \frac{\alpha(\vec{x'})(\vec{x}-\vec{x'})}{|\vec{x}-\vec{x'}|^2} d\vec{x'} + \frac{1}{2\pi} \int_C \frac{\vec{\gamma}(\vec{x'}) \times \vec{x}-\vec{x'})}{|\vec{x}-\vec{x'}|^2} d\vec{x'}$$

$$= \sum_{n=1}^{N} \{-\alpha_n \vec{B}_n + \vec{\gamma}_n \times \vec{B}_n\}$$

wherein "$\alpha_n$" and "$\vec{\gamma}$" are the strengths for panel "n" of length "$l_n$", the object is defined by "N" panels, and $$B_n = \frac{1}{2\pi} \int_{l_n} \frac{\vec{x}-\vec{x'}}{|\vec{x}-\vec{x'}|^2} dx'$$

6. Apparatus as recited in claim 5 wherein the known velocity of the vorticity elements at the object surface is 0, the initial thickness of each element is:

$$\sqrt{2\nu \Delta t}$$

and the vorticity of the element is:

$$\vec{\omega} \cdot dA = \vec{\gamma} \cdot dl$$

where $\vec{\omega}$ is the element vorticity, dA is the element area, $\vec{\gamma}$ is the surface velocity jump on the panel and dl is the surface panel length.

7. Apparatus as recited in claim 6 wherein the associated velocity field is determined by $$\vec{u}(\vec{x}) = \frac{1}{2\pi} \int_X \frac{\vec{\omega} \times (\vec{x}-\vec{x'})}{|\vec{x}-\vec{x'}|^2} dS$$

8. Apparatus as recited in claim 7 wherein summing means provides a final expression for each velocity component according to $$\psi = \sum_{n=0}^{\infty} \sum_{m=0}^{n} B_{n-m,m} h^{n-m} k^m$$

wherein "B" represents the coefficients of the far-field influence of all vorticity elements and "h" and "k" represent the local coordinates relative the center of each box in the field.

9. A method for producing a representation of predicted flow in an area of interest around an object comprising the steps of:
   defining a model of the object,
   defining a plurality of vorticity segments over the area of interest including vorticity segments at the surface of the object having a known velocity,
   defining over the area of interest a plurality of sets of boxes, each set having a predetermined relationship in size and position to the boxes in the other sets,
   determining the velocity for each segment based upon the vorticity of that segment, the vorticity of each segment in the same box and in neighboring boxes and the vorticity of groups of other boxes surrounding the neighboring boxes taken collectively,
   summing the velocities thereby to determine the velocity of each segment based upon the influence of all the vorticity segments in the area of interest, and
   displaying the predicted flow over the area of interest in response to the summation of the velocities.

10. A method as recited in claim 9 wherein the velocity of each box is determined by summing the influence of all vorticities of the vortex segments in that box about the center of that box.

11. A method as recited in claim 3 wherein each set of boxes has a predetermined level, L, wherein L=0 designates the first set of boxes and wherein each additional set of boxes comprises $4^L$ boxes.

12. A method as recited in claim 11 wherein said velocity is defined on the bases of groups of other boxes for sets in which L>1.

13. A method as recited in claim 12 wherein the relationship between the velocity and vorticity of each vorticity segment is given by:

$$\vec{u}(\vec{x}) = \frac{1}{2\pi} \int_C \frac{\alpha(\vec{x}')(\vec{x}-\vec{x}')}{|\vec{x}-\vec{x}'|^2} d\vec{x}'$$
$$+ \frac{1}{2\pi} \int_C \frac{\vec{\gamma}(\vec{x}') \times (\vec{x}-\vec{x}')}{|\vec{x}-\vec{x}'|^2} d\vec{x}'$$
$$= \sum_{n=1}^{N} \{-\alpha_n \vec{B}_n + \vec{\gamma}_n \times \vec{B}_n\}$$

wherein "$\alpha_n$" and "$\vec{\gamma}$" are the strengths for panel "n" of length "$l_n$", the object is defined by "N" panels, and $$B_n = \frac{1}{2\pi} \int_n \frac{|\vec{x}-\vec{x}'|}{|\vec{x}-\vec{x}'|^2} dx'$$

14. A method as recited in claim 13 wherein the known velocity of the vorticity elements at the object surface is 0, the initial thickness of each element is:

$$\sqrt{2\nu\Delta t}$$

and the vorticity of the element is:

$$\vec{\omega} \cdot dA = \vec{\gamma} \cdot dl$$

where $\vec{\omega}$ is the element vorticity, dA is the element area, $\vec{\gamma}$ is the surface velocity jump on the panel and dl is the surface panel length.

15. A method as recited in claim 14 wherein the associated velocity field is determined by $$\vec{u}(\vec{x}) = \frac{1}{2\pi} \int_x \frac{\vec{\omega} \times (\vec{x}-\vec{x}')}{|\vec{x}-\vec{x}'|^2} dS$$

16. A method as recited in claim 15 wherein said summing step provides a final expression for each velocity component according to $$\psi = \sum_{n=0}^{\infty} \sum_{m=0}^{n} B_{n-m,m} h^{n-m} k^m$$

wherein "B" represents the coefficients of the far-field influence of all vorticity elements and "h" and "k" represent the local coordinates relative the center of each box in the field.

* * * * *